(12) United States Patent
Pan

(10) Patent No.: US 7,299,077 B2
(45) Date of Patent: Nov. 20, 2007

(54) EXCHANGEABLE DECOR PANEL FOR PORTABLE CELLULAR PHONE

(75) Inventor: Long-Jyh Pan, Taipei (TW)

(73) Assignee: BENQ Corporation, TaoYuan (TW)

( * ) Notice: Subject to any disclaimer, the term of this patent is extended or adjusted under 35 U.S.C. 154(b) by 793 days.

(21) Appl. No.: 10/795,332

(22) Filed: Mar. 9, 2004

(65) Prior Publication Data

US 2004/0180706 A1 Sep. 16, 2004

(30) Foreign Application Priority Data

Mar. 14, 2003 (TW) ............................... 92203933 U

(51) Int. Cl.
*H04M 1/00* (2006.01)
(52) U.S. Cl. ............................... 455/575.3; 455/575.1; 455/550.1
(58) Field of Classification Search ............ 455/575.1, 455/550.1, 575.3; 379/450, 440; D14/248, D14/138
See application file for complete search history.

(56) References Cited

U.S. PATENT DOCUMENTS

2004/0109560 A1* 6/2004 Nuovo et al. ................ 379/440

FOREIGN PATENT DOCUMENTS

JP 411017794 A * 1/1999

* cited by examiner

*Primary Examiner*—Melur Ramakrishnaiah
(74) *Attorney, Agent, or Firm*—Troxell Law Office, PLLC

(57) ABSTRACT

A structure of exchangeable décor panel for portable cellular phone that is applied to the folding portable cellular phone having a continuing groove located on a proper position of flip cover and base portion thereof for accommodating a décor panel made of flexible material, wherein said flexible décor panel is installed in its inner side with two rigid plates whose outer rims conform exactly to the outer rims of said décor panel, moreover, there is at least one retainer extending outwards from the outer rim of said rigid plate for clipping on the corresponding retainer holes installed inside said continuing groove to form a compact structure, thus, said décor panel can be changed at will to enable said cellular phone to have different appearance.

8 Claims, 7 Drawing Sheets

EXCHANGEABLE DECOR PANEL FOR PORTABLE CELLULAR PHONE

BACKGROUND OF THE INVENTION (a). Field of the Invention

The present invention relates to a portable cellular phone with exchangeable décor panel, more specifically to an exterior décor panel design for the folding portable cellular phone.

(b). Description of the Prior Arts

Today, telecommunication industry is becoming more and more important for human life. There are products from the early telephone, fax machine and intercom and so on, to the Global Positioning System (GPS), pager, wireless communication and fixed network etc. of the modem world. The advances in the telecommunication industry are making it possible to rapidly transmit the voice, image and graphic via a wireless means. The result is the fast development and prosperity of the global economy and industry. Consequently, the computer industry and the telecommunication industry are destined to become the two leading industry which can progress in the speed beyond human imagination and bring a vast change to human life.

Due to the development of GSM cellular phone, portable cellular phones have come into wide use in Taiwan for connecting friends, relatives and clients with great efficiency. Moreover, the global roaming capability of the GSM cellular phone enables the user to be able to use his portable cellular phone everywhere in the world that, in consequence, provides a favorable condition for the prevalence of cellular phone. Besides, in addition to the common answering incoming calls and issuing outgoing calls, modem cellular phones have many additional functions (such as recording, calendar, games, MP3, WAP, etc.). Please refer to FIG. 1, a schematic drawing is presented illustrating a structure of exchangeable décor panel for portable cellular phone. In order to pander to people's liking for novelty, some cellular phone manufacturers design a product with exchangeable décor panel that can be changed by consumers (e.g. Nokia 3310, 8810, etc.). The kind of cellular phone is composed of a body A2, a front cover A1 and a back cover A3. Through changing the front cover A1 and back cover A3 with different pattern and color, the consumer's craving for novelty can be fulfilled.

While changing the décor panel of the portable cellular phone using the aforementioned method, in order to prevent the décor panel from falling off by outside influences, the locking clasps between the front and back cover are designed to be rigidly precise. Therefore, the method for changing the décor panel of the portable cellular phone can still present a daunting task for many users. The method will require many practices to be able to master and is not acceptable for most consumers.

As to the folding portable cellular phone, it is common that no structure with exchangeable décor panel is installed. Therefore, the appearance of the kind of cellular phone is usually too stale to stir up the craving of young cellular phone consumers. In view of the above drawback, the present invention is related to a structure of exchangeable décor panel for the folding portable cellular phone.

SUMMARY OF THE INVENTION

In view of the above drawback of the prior art, the present invention is a portable cellular phone with exchangeable décor panel. The primary object of the present invention is to provide a folding portable cellular phone having a continuing groove located at a proper position of the flip cover and the base portion thereof for accommodating a décor panel made of flexible material. The flexible décor panel is installed in its inner side with two rigid plates whose outer rims conform exactly to the outer rims of the décor panel. There is at least one retainer extending outwards from the outer rim of the rigid plate for clipping on the corresponding retainer holes installed inside the continuing groove to form a compact structure. Thus, the décor panel can be changed at will to enable the cellular phone to have different appearance.

Another object of the present invention is to enable users of the portable cellular phone to take off and change the décor panel by themselves without the help of any auxiliary tools, so that the décor panel of the cellular phone can be changed with ease and convenience.

The third object of the present invention is to provide an opening installed at the proper position of the décor panel and the rigid plate to cooperate with a second screen of the cellular phone for displaying.

Yet another object of the present invention is to provide the cellular phone with a better protection while subjecting to an impact by employing the flexible décor panel as a buffer.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

Figure 1:
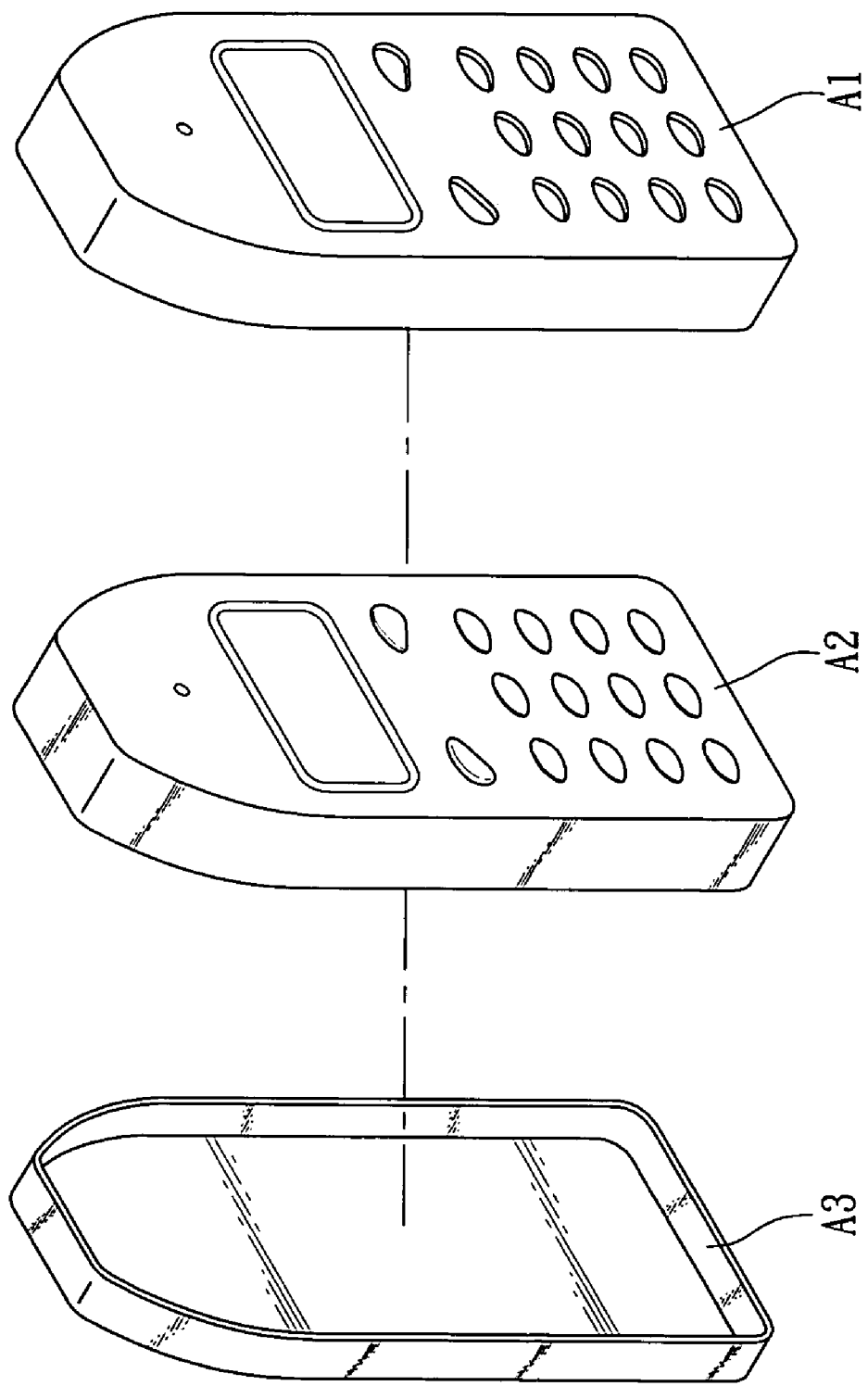
FIG. 1 is a schematic drawing showing a structure of exchangeable décor panel for portable cellular phone according to prior art.
Figure 2:
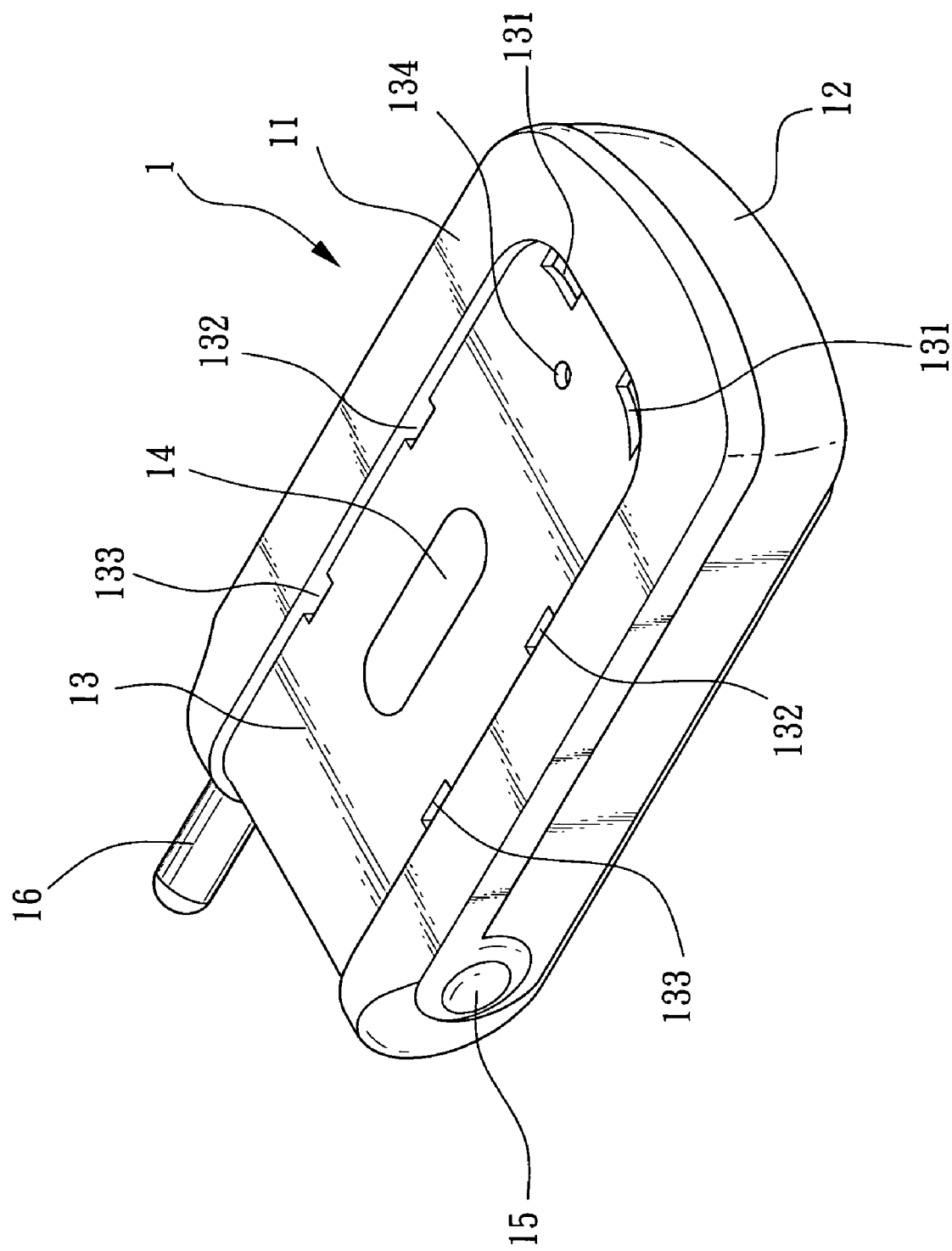
FIG. 2 is the first three dimensional schematic representation depicting the main body of the cellular phone according to the present invention.
Figure 3:
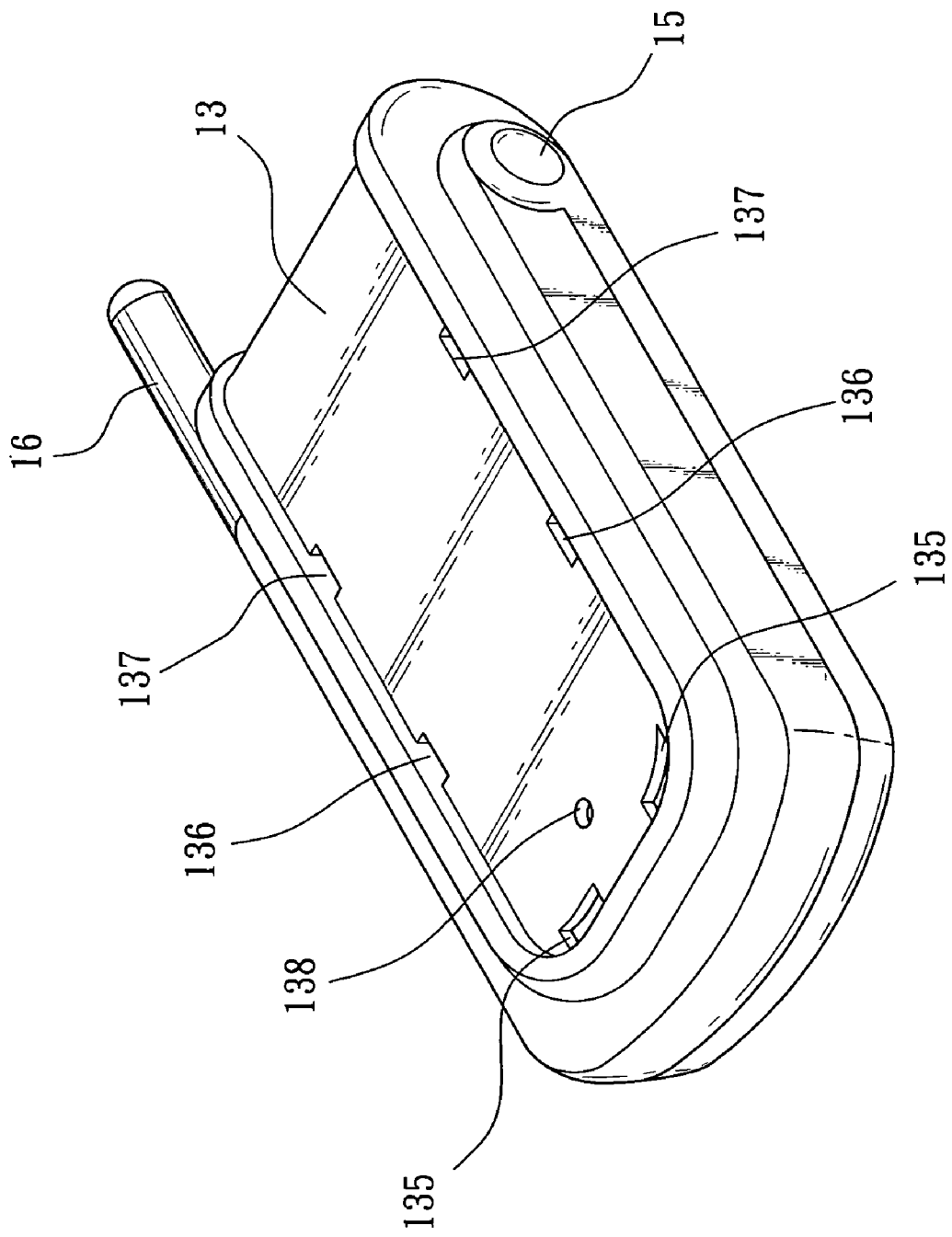
FIG. 3 is the second three dimensional schematic representation depicting the main body of the cellular phone according to the present invention.
Figure 4:
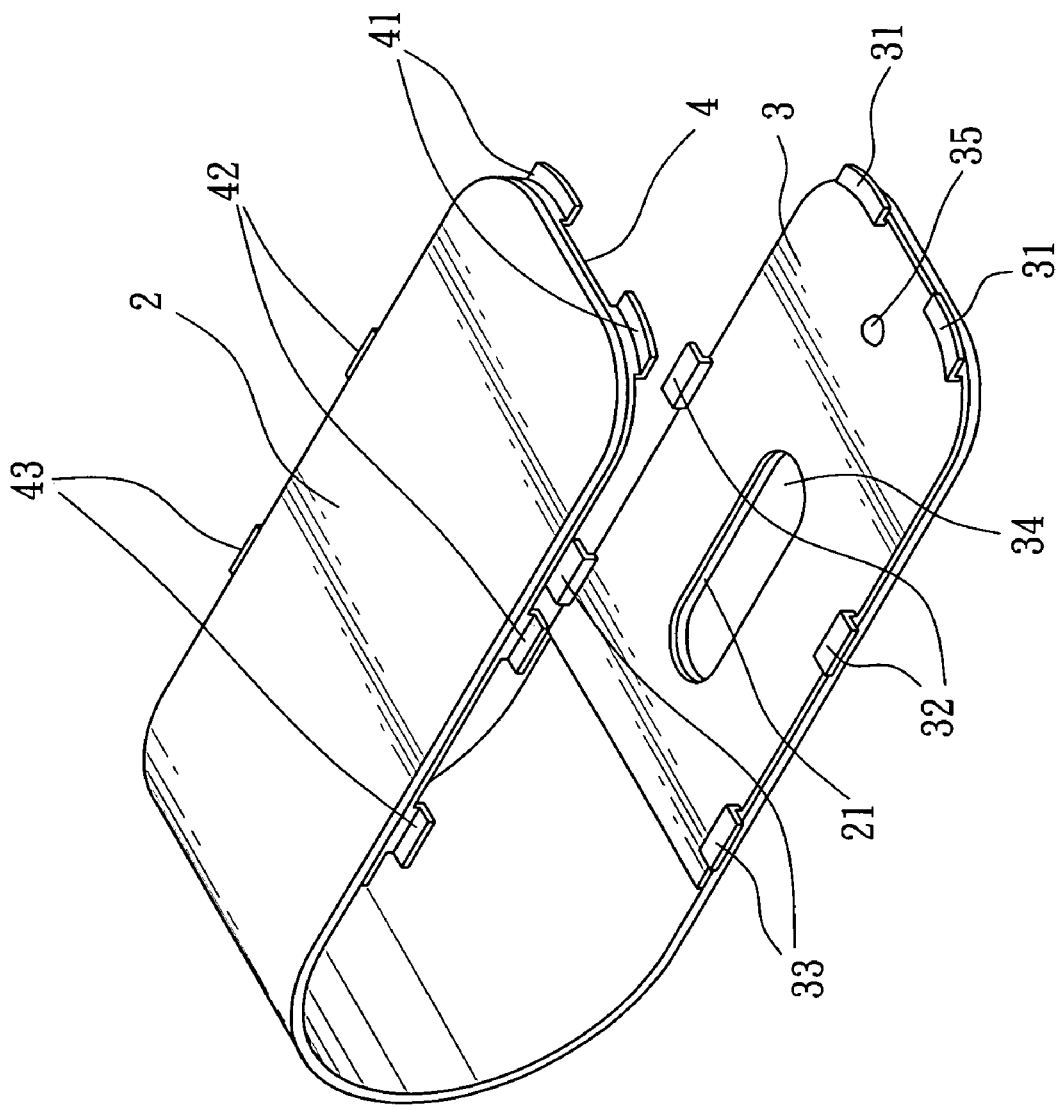
FIG. 4 is the first three dimensional schematic representation depicting the décor panel of the cellular phone according to the present invention.
Figure 5:
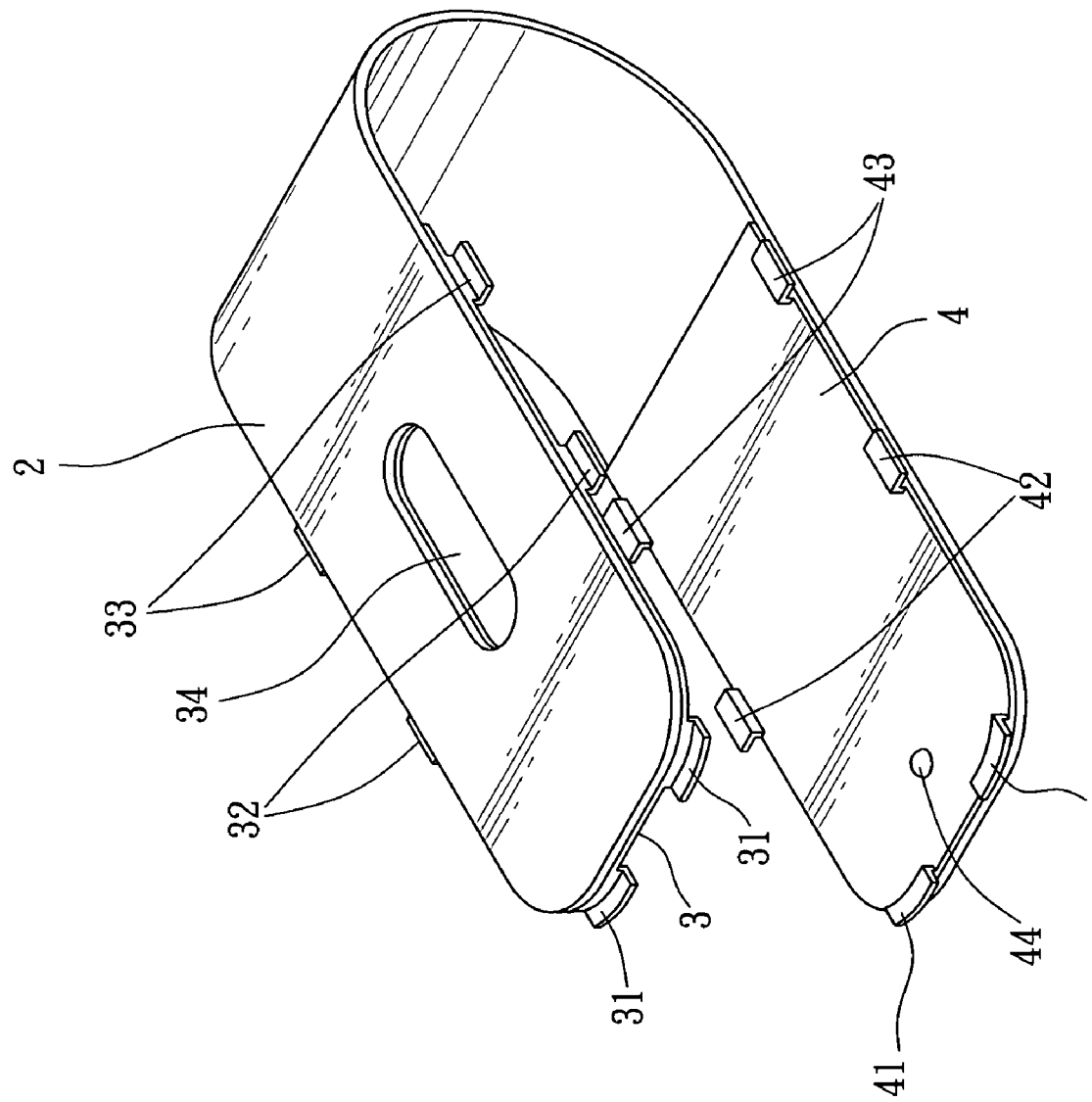
FIG. 5 is the second three dimensional schematic representation depicting the décor panel of the cellular phone according to the present invention.

The following embodiments will illustrate the device and the method for processing the digital image of the present invention in detail.

Please refer to FIG. 2, FIG. 3, FIG. 4, and FIG. 5, the portable cellular phone, as shown, is a folding cellular phone 1 having a continuing groove located at a proper position of the flip cover 11 and the base portion 12 thereof, wherein the groove 12 located on the flip cover 11 is installed with a first retainer hole 131, a second retainer hole 132, a third retainer hole 133 and a fourth retainer hole 134; and the groove 12 located on the base portion 12 is installed with a fifth retainer hole 135, a sixth retainer hole 136, a seventh retainer hole 137 and a eighth retainer hole 138, moreover, the groove 12 can accommodate a flexible décor panel 2 made of rubber. The surface of the décor panel 2 can be painted with all kinds of patterns and colors for the attraction of consumer's attendance. The two inner sides of the flexible décor panel 2 are installed with a first rigid plate 3 and a second rigid plate 4. The two rigid plates (3, 4) are made of a metal or rigid plastic, and the outer rims thereof conform exactly to the outer rims of the décor panel 2, wherein a first retainer 31, a second retainer 32 and a third retainer 33 are protruding outwards from the outer rim of the first rigid plate 3, and further, a first bump 35 is installed at a proper position in the inner side of the first rigid plate 3; correspondingly, a fourth retainer 41, a fifth retainer 42 and a sixth retainer 43 are protruding outwards from the outer rim of the second rigid plate 4, and further a second bump 44 is installed at a proper position in the inner side of the second rigid plate 4. A hinge 15 connecting the flip cover 11 and the base portion 12 of the folding cellular phone 1 is covered by the décor panel 2, so that it can be a simple and practical structure without the need for beautification to save the cost for designing the hinge 15. An antenna 16 is installed at a proper position of the cellular phone 1 for receiving and transmitting signals.

Besides the foregoing décor panel structure for the cellular phone, in response to the most popular folding cellular phone design these days is a cellular with double screens, where a second screen 14 is installed on the outer side of the flip cover 11 in addition to the first screen (not shown) installed on the inner side of the flip cover 11. The second screen 14 can display information, such as time, caller ID, signal strength, etc., which otherwise can not be read using the conventional folding cellular phone 1 before opening its flip cover. Therefore, according to the present invention, the décor panel of the folding cellular phone with double screens is installed with an opening (21, 34) to cooperate with the second screen 14 of the cellular phone for displaying information.

Figure 6:
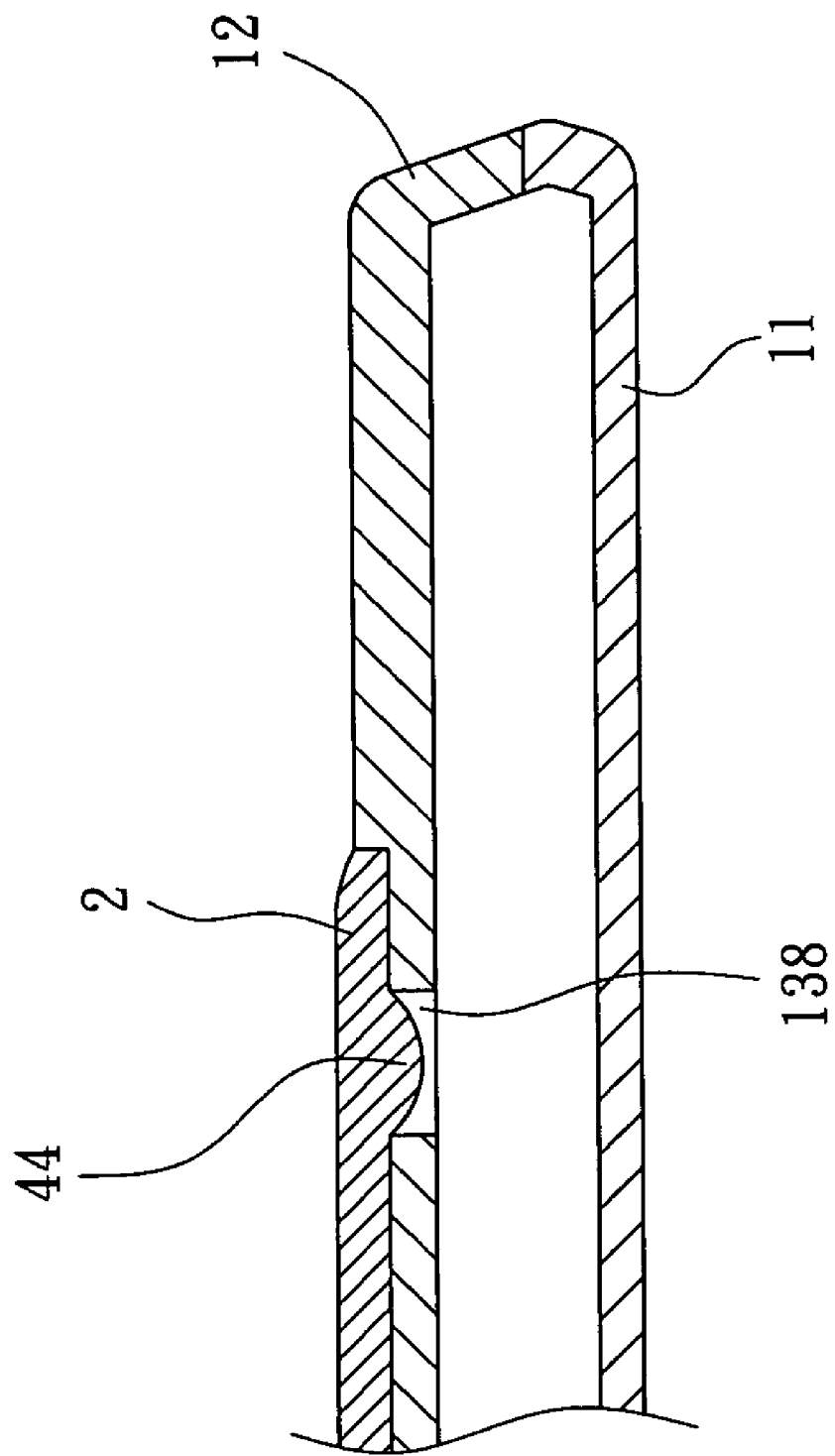
FIG. 6 is a sectional side view schematically showing a compact structure formed by fitting a bump protruding outwards from the décor panel to the retainer holes of the main body according to the present invention.
Figure 7:
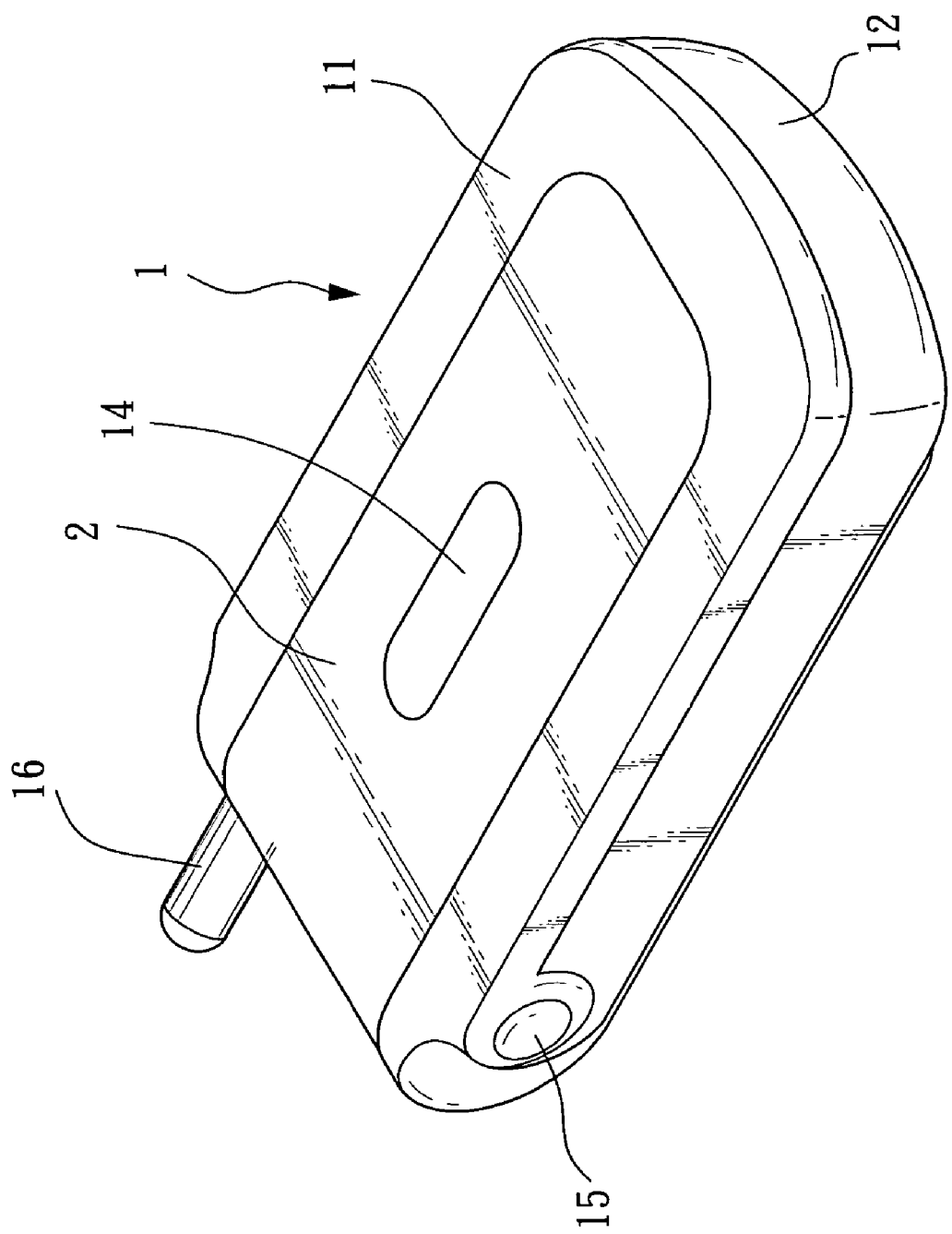
FIG. 7 is a three dimensional schematic representation depicting the formation of the main body of cellular phone and the décor panel according to the present invention.

As shown in FIG. 6 and FIG. 7, in order to combine the cellular phone 1 with the décor panel 2, the first retainer 31, the second retainer 32 and the third retainer 33 protruding outwards from the outer rim of the décor panel 2 are clipped on the corresponding first retainer hole 131, the second retainer hole 132 and the hird retainer hole 133, and, the same time that the first bump 35 located on the first rigid plate 3 slips into the fourth retainer hole 134, so that a structure with décor panel 2 fixed on the flip cover 11 is complete, furthermore, the fourth retainer 41, the fifth retainer 42 and the sixth retainer 43 of the décor panel 2 are clipped on the corresponding fifth retainer hole 135, the sixth retainer hole 162 and the seventh retainer hole 137, and, the same time that the second bump 44 located on the second rigid plate 4 slips into the eighth retainer hole 138, so that a structure with décor panel 2 fixed on the base portion 12 is complete As shown in the aforementioned FIG. 1 to FIG. 7, the present invention indeed can be applied to the folding portable cellular phone with functions that can not be accomplished by the prior art. That is, the present invention having a continuing groove for accommodating a flexible décor panel, wherein the flexible décor panel contains in its inner side two rigid plates with at least one set of protruding retainer for clipping on the continuing groove to form a compact structure. Thus, the décor panel can be changed at will to enable the cellular phone to have different appearance. Besides, the present invention provides the cellular phone with a better protection while subjecting to an impact by employing the flexible décor panel as a buffer. Moreover, A hinge connecting the flip cover and the base portion of the folding cellular phone is covered by the décor panel, so that it can be a simple and practical structure without the need for beautification.

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. A structure of exchangeable décor panel for portable cellular phone that is applied to a folding portable cellular phone having a continuing groove located its flip cover and base portion for accommodating a décor panel made of flexible material, wherein the inner side of said flexible décor panel is installed with two rigid plates whose outer rims conform exactly to the outer rims of said décor panel, moreover, there is at least one retainer extending outwards from the outer rim of said rigid plate for clipping onto a corresponding retainer hole installed inside said continuing groove to form a compact structure, thus, said décor panel can be changed at will for enabling said cellular phone to have different appearance.

2. The structure of claim 1, wherein said décor panel is made of rubber.

3. The structure of claim 1, wherein said décor panel is made of leather.

4. The structure of claim 1, wherein said décor panel is made of a metal.

5. The structure of claim 1, wherein said rigid plate is made of a rigid plastic.

6. The structure of claim 1, wherein an opening is installed on said décor panel and said rigid plate to cooperate with a second screen of said cellular phone for displaying.

7. The structure of claim 1, wherein at least one bump is installed respectively in the inner side of both said rigid plates for fitting into a retainer hole located on said groove of said cellular phone so as to form a structure for fixing said décor panel onto the exterior of said cellular phone.

8. The structure of claim 1, wherein said retainer holes located on said groove include a first retainer hole, a second retainer hole, a third retainer hole, a fourth retainer hole, a fifth retainer hole, a sixth retainer hole, a seventh retainer hole, and an eighth retainer hole, which corresponding to a first retainer, a second retainer, a third retainer, a fourth retainer, a fifth retainer, a sixth retainer, a seventh retainer, and an eighth retainer of said second rigid plate for fixing said décor panel onto said cellular phone.

* * * * *